C. I. HALL.
CHARGING SYSTEM FOR STORAGE BATTERIES.
APPLICATION FILED JUNE 8, 1916.
1,312,980.
Patented Aug. 12, 1919.
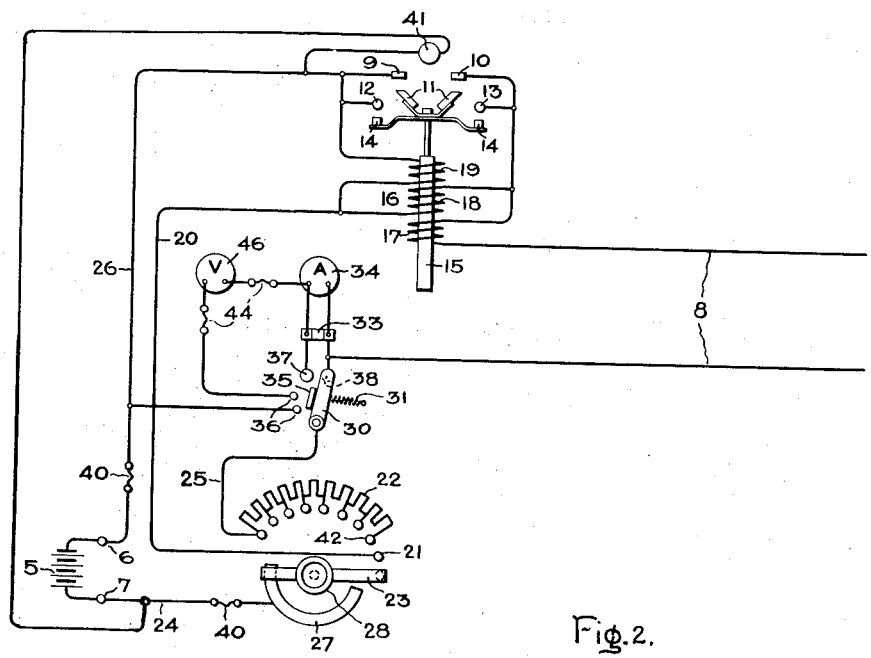
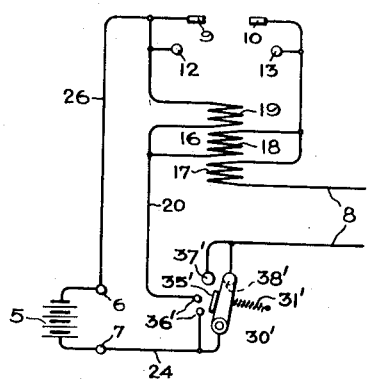
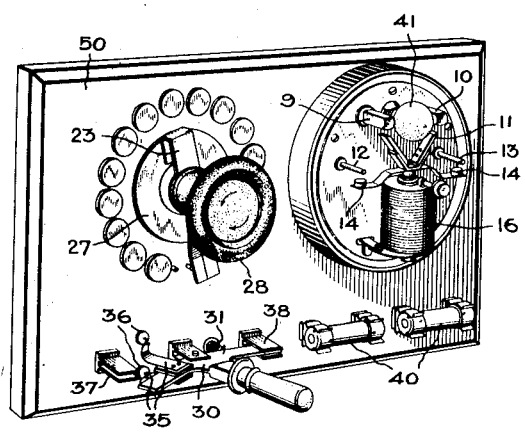
Inventor:
Chester I. Hall,
by
His Attorney.

UNITED STATES PATENT OFFICE.

CHESTER I. HALL, OF FORT WAYNE, INDIANA, ASSIGNOR TO GENERAL ELECTRIC COMPANY, A CORPORATION OF NEW YORK.

CHARGING SYSTEM FOR STORAGE BATTERIES.

1,312,980.  Specification of Letters Patent.  Patented Aug. 12, 1919.

Application filed June 8, 1916. Serial No. 102,575.

*To all whom it may concern:*

Be it known that I, CHESTER I. HALL, a citizen of the United States, residing at Fort Wayne, in the county of Allen, State of Indiana, have invented certain new and useful Improvements in Charging Systems for Storage Batteries, of which the following is a specification.

My invention relates to charging systems for storage batteries and in particular to an automatic charging apparatus for storage batteries, such, for example, as are employed on motor vehicles.

The object of the invention is to provide an improved storage battery charging system, and more particularly to provide such a system with an improved automatic circuit controlling apparatus. More specifically, the object of the invention is to provide an automatic charging apparatus for such a system which renders the charging of storage batteries as nearly "fool-proof" as possible, by preventing improper manipulation of the battery, switching devices, and the like, such as would cause injury to the various parts of the system.

In large garages where electric vehicle charging is done on a large scale the charging switchboard is removed from the vehicle storage floor, and is, in general, placed upon a gallery, or within a separate room, in charge of a more or less skilled operator. The attaching of the cars to the line ready for charging is done by the washers or watchmen on the storage floor, and the further routine work of charging is carried out by the skilled operator in the gallery. In accordance with my present invention, I provide an improved storage battery charging apparatus which will complete the electric circuit between the battery and the source of charging current when the electrical conditions of the system are correct for charging and will hold the circuit open when such conditions are not correct for charging. Thus, if the battery has been incorrectly plugged in, as for example with reversed polarity for the charging operation, the apparatus of my present invention will hold the circuit open so that the battery cannot be electrically connected to the line. Furthermore, if any condition exists in the system to prevent the flow of a normal amount of charging current from the line to the battery, my improved apparatus will operate to automatically open the circuit, thus disconnecting the battery from the line, and charging cannot thereafter take place until the apparatus has been restored to its initial condition.

The novel features of the invention which I believe to be patentable are definitely indicated in the claims appended hereto. The principle of the invention and its embodiment in a storage battery charging system will be best understood from the following description taken in conjunction with the accompanying drawings, in which;

Figure 1 is a diagrammatic view of a storage battery charging system embodying the invention; Fig. 2 is a perspective view of the switchboard panel upon which is mounted the circuit controlling apparatus of the system of Fig. 1; and Fig. 3 is a slightly modified arrangement of the controlling apparatus of the system.

In the system diagrammatically illustrated in Fig. 1, there is represented a storage battery 5 connected to charging plugs or terminals 6 and 7 of the charging apparatus. The charging apparatus is designed to deliver direct current energy from supply mains 8 to the battery 5, and the improved circuit controlling apparatus of my present invention is interposed between the mains and the battery.

The circuit controlling apparatus shown in Figs. 1 and 2 is in effect an automatic charging switch comprising main fixed contacts 9 and 10 and coöperating movable contacts 11 and auxiliary fixed and movable contacts 12—13 and 14, respectively. The four movable contacts 11 and 14 are electrically interconnected, and are carried at the upper end of the magnetic armature or plunger 15 of a relay 16. The winding of the relay consists of three separate coils 17, 18 and 19. The coil 17 is designed to be connected in series relation in the charging circuit during the charging operation, and operates to hold the switch closed as long as the charging current exceeds a predetermined adjustable minimum value. The coil 18 of the relay is designed to be connected to the supply mains 8, while the coil 19 is designed to be connected to the terminals of the battery 5. The coils 18 and 19 are so wound that their magnetic effects upon the armature 15 are accumulative when the battery 5 is properly connected to the terminals 6 and 7.

One terminal of each of the coils 18 and 19 is connected by a conductor 20 to the first live button 21 of a battery charging rheostat 22. This rheostat has a movable contact member 23 adapted to electrically connect the contact buttons of the rheostat to a contact plate 27. A handle 28 is provided for moving the contact member 23 into engagement with any contact button. In its initial or zero position the contact member 23 rests upon a dead button, and this is the position in which the member is shown in both Figs. 1 and 2. The contact plate 27 is electrically connected by a conductor 24 to the charging plug 7. The last button of the rheostat is connected by conductor 25 to one side of the supply mains 8, while the other terminal of the coil 18 is connected to the other side of the supply mains and also to contacts 10 and 13. The other terminal of the coil 19 is connected to contacts 9 and 12, and thence to the charging plug 6 by means of a conductor 26.

An instrument switch 30 is included in the conductor 25. A spring 31 operates to normally hold this switch in the position indicated in Figs. 1 and 2, with the switch blade in engagement with a fixed contact 38, whereby the battery charging rheostat is directly connected to one side of the supply mains. Movement of the switch 30 toward the left (Figs. 1 and 2) into engagement with the fixed contact 37 includes a current shunt 33 in the circuit. An ammeter 34 is connected across the shunt and is adapted to indicate the charging current. The switch 30 carries auxiliary contacts 35, insulated from the main switch blade and electrically connected together, adapted to engage stationary contact buttons 36 when the switch is in its left-hand position. A voltmeter 46 is connected between the fixed contact 37 and one of the contact buttons 36. It will thus be evident that the operator can at any time during the charging operation observe the charging current and voltage by throwing the switch 30 to its lefthand position, so that the switch blade engages the fixed contact 37. The spring 31 always tends to throw the switch to its normal righthand position, with the switch blade in engagement with the fixed contact 38, so that the instruments are only in circuit while the operator manually holds the switch in its lefthand position. The voltmeter is preferably protected by fuses 44 on either side thereof. The blade of the instrument switch is so designed that it is always in engagement with one or the other of the fixed contacts 37 and 38, and is only disconnected from either of these contacts by throwing the blade to its extreme position in one direction or the other, as the case may be. Manipulation of the instrument switch thus does not interrupt the charging current.

A signal lamp 41 is connected across the conductors 20 and 26 and serves to indicate when a battery has been plugged into the terminals 6—7. This signal lamp will glow as soon as the rheostat controller 23 engages contact button 21, whether the battery is plugged in correctly or not, and the lamp thus serves to notify the operator in the gallery of the connection of a battery to the charging terminals 6—7.

The operation of the system is substantially as follows: When a battery is plugged into the terminals 6—7 on the charging floor the lamp 41 lights up. The operator in the gallery, or wherever the switchboard panels are located, is thus advised of the connection of a battery to be charged to the apparatus. He, accordingly, then moves the rheostat handle and movable contact member from the dead button in a forward direction (counterclockwise in the figures of the drawings) passing over the first live button 21, the adjacent live button 42 and such other buttons of the rheostat as are necessary to regulate the charging current. When the contact member 23 is connected to button 21, current flows from the battery through the coil 19 of the relay. The magnetization produced by this coil alone is, however, insufficient to cause the main charging switch to close. As the contact member 23 progresses it bridges contacts 21 and 42, and when in this position both the coils 18 and 19 are energized, the one from the D. C. mains 8 and the other from the battery 5. If the two coils act in conjunction, or in other words, if the polarity of the battery is correct, the resultant magnetization of the two coils will be sufficient to pull up the armature 15 and close the main switch. The instant the charging switch closes, current begins to flow from the line to the battery through the maximum resistance of the rheostat, thus energizing the series coil 17 of the relay and holding the switch in its closed position. The operator then moves the rheostat handle to the desired charging position, which opens the circuits of the two coils 18 and 19, so that the charging switch is held closed merely by the flux of the series coil 17. If, then, any condition exists in the system to prevent a normal amount of charging current flowing from the line to the battery, the switch will automatically open, thus disconnecting the battery from the line.

The circuit between the battery and the supply mains is first completed by the engagement of the auxiliary contacts 12—13 and 14 of the charging switch. Immediately after the engagement of these contacts the main switch-contacts 9—10 and 11 come into engagement and the charging circuit is then completed through both sets of contacts. In the opening of the switch the main contacts 9—10 and 11 are first interrupted and the circuit is opened by the disengagement of the auxiliary contacts 12—13 and 14. The auxiliary contacts are made of carbon and are designed to break any current which may be flowing through the switch. The auxiliary contacts are thus closed in advance of the main contacts and opened after the opening of the main contacts and are provided for the purpose of preventing any objectionable arcing at the main contacts.

If the battery 5 is plugged into the charging terminals 6—7 with reverse polarity, an entirely different condition exists within the circuit controlling apparatus than previously described. When the contact member 23 is now moved into engagement with contact button 21, the coil 19 will be energized from the battery in the reverse direction. Further movement of the contact member bridges contacts 21 and 42 and connects coil 18 to the mains 8, but the two coils will now be acting in opposition to each other, so that practically no flux will be created and the charging switch will not close. It will also be noted that under this condition the two coils 18 and 19 are connected in series with each other and in series with the line and battery, but they nevertheless magnetically act in opposition to each other. It will, therefore, be impossible for the operator to close the charging switch. This immediately indicates to him that the battery is connected in reverse, and by reversing the battery terminals the normal charging condition can be brought about and charging begun.

If the battery is removed from the circuit during the time of charging, the current flowing in the series coil 17 will cease and the charging switch will open, thus immediately removing potential from the charging terminals. It will also be noted that it is necessary for the operator to move the rheostat handle to the position of maximum resistance before charging can again be renewed. In other words, if through oversight the operator has not moved the rheostat handle to its initial position after the completion of a charge and a battery is plugged into the terminals for the next charge, no current can flow until the movable contact member 23 of the rheostat has been moved into engagement with buttons 21 and 42, which automatically throws in the maximum resistance of the rheostat. Another important feature of the present system is that if any fault occurs in any part of the apparatus, such as the burning out of a fuse, breaking of a wire, the opening of a terminal, and the like, it is impossible to close the switch, and, therefore, impossible to do damage to the charging apparatus or the battery. The apparatus is designed to prevent mistakes of the attendant from causing injury to the apparatus or battery, and thus to make possible the use of less skilful attendants.

Fig. 2 shows the compact form which the apparatus assumes in practice. The relay and contacts of the charging switch are mounted in the upper righthand corner of a switchboard panel 50, while the contact buttons and controlling handle of the rheostat are mounted in the upper lefthand corner of the panel. In this figure the handle of the rheostat is shown in its initial or zero position resting upon the dead button. The next button, with respect to counterclockwise movement of the handle, is the button 21 connected to the two shunt coils 18 and 19 of the relay. The ammeter and voltmeter switch 30 is located beneath the rheostat controller, while main line fuses 40 are mounted below the charging switch.

One of the important features of my improved charging system is that the switch mechanism operates automatically for both the opening and closing of the charging circuit, thus eliminating all manual manipulation, except the moving of the rheostat handle to the proper charging position. The necessity for the return of the rheostat handle to the maximum resistance position before the charging circuit can be closed, after this circuit has been opened, protects the battery and switchboard against an initial rush of current such as would result if the circuit were closed without resistance. Furthermore, the apparatus of my present invention automatically prevents the possibility of the flow of current from the D. C. supply line to the battery until a battery of approximately the correct potential is connected at the charging plugs with the proper polarity, regardless of the proper or improper manipulation of the apparatus by the operator. This results from the fact that the shunt coils 18 and 19 are designed to be energized from sources whose voltages are substantially of a predetermined value. The flux resulting from the energization of either of these coils alone is not sufficient to operate the main charging switch, but on the other hand this switch requires for its operation a flux which is only produced when the shunt coils 18 and 19 are energized from sources whose voltages are approximately equal to the predetermined voltages for which these coils are designed. Thus, if for any reason the battery voltage or the voltage of the charging source is abnormally low, the resultant flux of the two coils 18 and 19 will be insufficient to close the charging switch, even if these coils act in conjunction. The apparatus also provides a signal for indicating to the operator that a battery has been connected to the charging plugs and is ready for charging, and, by the closing or non-closing of the main charging switch, the operator can tell whether or not this battery is properly connected, and, thus, if the main switch closes, he knows that he is entirely safe in proceeding with the adjustment of the charging current to the capacity of the battery connected. It will also be obvious that this automatic operation is obtained by the use of but little energy, as the two shunt coils 18 and 19 are connected in circuit only when the rheostat handle engages the first live button of the rheostat.

In Fig. 3 I have shown a slightly modified form of the apparatus designed for use in connection with constant potential charging systems. In this modification of the apparatus, the battery charging rheostat is dispensed with, and only a single double-throw switch 30' is employed for controlling the main charging switch. The switch 30' is preferably of the type of the instrument switch 30, and is biased to its normal charging position by a spring 31'. The common terminal of the two shunt coils 18 and 19 is connected to one of the contact buttons 36', while the other contact button 36' is connected to the charging plug 7. The fixed contacts 37' and 38' are connected to one side of the mains 8. The other electrical connections are the same as in the system of Fig. 1, and corresponding elements of the two systems are designated by the same reference character. With the apparatus of Fig. 3, the operator simply moves the handle of the switch 30' toward the left and immediately releases it, the spring 31' thereupon returning the switch to its righthand position. Movement of the switch 30' to its lefthand position completes the circuits of the shunt coils 18 and 19, and if the electrical conditions of the system are correct so that these two coils act in conjunction, the main charging switch will be closed, and charging can be commenced. When the switch 30' is returned to its righthand position, the shunt coils 18 and 19 are deënergized, and the series coil 17 serves to maintain the charging switch closed. As the battery voltage rises, the charging current will decrease until a predetermined minimum value is reached when the main charging switch will automatically open and cut off the battery.

What I claim as new and desire to secure by Letters Patent of the United States, is:—

1. A storage battery charging apparatus comprising a relay having three coils, one of said coils being designed to carry a current proportional to the charging current, the second of said coils being designed to carry a current proportional to the charging voltage and the third of said coils being designed to carry a current proportional to the voltage of the battery to be charged, a movable armature for said relay, circuit closing means controlled by said armature, and circuit controlling means adapted first to connect said second and third coils to their respective sources of current whereby said armature operates to actuate said circuit closing means if the electrical conditions of the apparatus are correct for charging and second to disconnect said coils and to establish the desired charging condition.

2. A storage battery charging system comprising in combination, a storage battery to be charged, a source of charging current, a relay having three coils one of which is responsive to the charging current the second of which is responsive to the charging voltage and the third of which is responsive to the battery voltage, a switch adapted to connect said battery to said source, an armature for said relay adapted to close said switch when the relay is properly energized, a battery charging rheostat having a movable controller which in one position connects said second and third coils to their respective sources of current whereby said armature operates to close said switch if these coils act in conjunction but operates to hold the switch open if these coils act in opposition and which in a second position disconnects said second and third coils from their respective sources of current and establishes the charging connections.

3. A storage battery charging system comprising in combination, a storage battery to be charged, a source of charging current, a relay having three coils one of which is responsive to the charging current the second of which is responsive to the charging voltage and the third of which is responsive to the battery voltage, a switch adapted to connect said battery to said source, an armature for said relay adapted to close said switch when the relay is properly energized, and circuit controlling means adapted first to connect said second and third coils to their respective sources of current whereby said armature operates to close said switch if the electrical conditions of the system are correct for charging and second to disconnect said coils and to establish the desired charging condition.

4. A storage battery charging system comprising in combination, a storage battery to be charged, a source of charging current, a circuit controlling device adapted to connect said battery to said source if the electrical conditions of the system are correct for charging and to prevent the connection of the battery to the source if the electrical conditions are not correct for charging, means included in said device for disconnecting said battery from said source if at any time during the charging operation the electrical conditions of the system become incorrect for charging, and a second and manually operated switch in operative relation to said device and adapted to be restored to its initial condition before the charging operation can be renewed when the battery has been disconnected from the source during the charging operation.

5. A storage battery charging system comprising in combination, a storage battery to be charged, a source of charging current, a switch adapted to connect said battery to said source, a relay having three coils one of which is designed to carry a current proportional to the charging current and the second and third of which are designed to carry currents proportional to the charging and battery voltages respectively, means associated with said relay for closing said switch when said second and third coils are conjunctly energized, means for connecting said second and third coils to their respective sources of current whereby said switch is closed if both coils act in conjunction but is held open if the two coils act in opposition, and means whereby one of said last two mentioned coils is disconnected from its source of current during the normal charging operation.

6. A storage battery charging system comprising in combination, a storage battery to be charged, a source of charging current, a switch adapted to connect said battery to said source, a relay having three coils one of which is designed to carry a current proportional to the charging current and the second and third of which are designed to carry currents proportional to the charging and battery voltages respectively, means associated with said relay for closing said switch when said second and third coils are conjunctly energized, means for connecting said second and third coils to their respective sources of current whereby said switch is closed if both coils act in conjunction but is held open if the two coils act in opposition, and means whereby both of said last two mentioned coils are disconnected from their respective sources of current during the normal charging operation and said switch is held closed by the coil responsive to the charging current until the charging current attains a minimum value.

7. A storage battery charging system comprising in combination, a storage battery to be charged, a source of charging current, a relay having three coils one of which is responsive to the charging current the second of which is responsive to the charging voltage and the third of which is responsive to the battery voltage, a switch adapted to connect said battery to said source, means associated with said relay for closing said switch when said second and third coils are conjunctly energized, circuit controlling means having a plurality of positions in one of which said second and third coils are connected to their respective sources of current whereby said switch is closed if both coils act in conjunction but is held open if the two coils act in opposition, and means whereby both of said last two mentioned coils are disconnected from their respective sources of current when said circuit controlling means occupies its normal battery charging position and said switch is held closely by the coil responsive to the charging current until the charging current attains a minimum value.

8. A storage battery charging system comprising in combination, a storage battery to be charged, a source of charging current, a relay having three coils one of which is responsive to the charging current, the second of which is responsive to the charging voltage and the third of which is responsive to the battery voltage, a switch adapted to connect said battery to said source, means associated with said relay for closing said switch when said second and third coils are conjunctly energized, circuit controlling means having a plurality of positions in one of which said second and third coils are connected to their respective sources of current whereby said switch is closed if both coils act in conjunction but is held open if the two coils act in opposition, means whereby both of said last two mentioned coils are disconnected from their respective sources of current when said circuit controlling means occupies its normal battery charging position and said switch is held closed by the coil responsive to the charging current, the connections between said second and third coils and the second controlling means being so arranged that the said circuit controlling means must be restored to its first mentioned position before charging can be renewed when the battery has been disconnected from the source during or after a charging operation.

9. A storage battery charging system comprising in combination, a storage battery to be charged, a source of charging current, a relay having three coils one of which is responsive to the charging current the second of which is responsive to the charging voltage and the third of which is responsive to the battery voltage, a switch adapted to connect said battery to said source, means associated with said relay for closing said switch when said second and third coils are conjunctly energized, a battery charging rheostat having a movable controller which in one position connects said second and third coils to their respective sources of current whereby said switch is closed if both coils act in conjunction but is held open if the two coils act in opposition and which in its next operative position disconnects said second and third coils from their respective sources of current and which in subsequent positions adjusts the charging current, the connections between said battery charging rheostat and controller and the second and third coils being so arranged that said controller must be restored to its first mentioned position before charging can be renewed when the battery has been disconnected from the source during or after a charging operation.

10. A storage battery charging system comprising in combination, a storage battery to be charged, a source of charging current, circuit closing means adapted to connect said battery to said source, circuit controlling means having a plurality of positions in one of which said circuit closing means is adapted to connect said battery to said source if the electrical conditions of the system are correct for charging and to prevent the connection of the battery to the source if the electrical conditions are not correct for charging and in another of which said battery is connected to the source for normal charging operation, the connections between said circuit controlling means and the circuit closing means being so arranged that the circuit controlling means must be restored to its first mentioned position before the charging operation can be renewed when the battery has been disconnected from the source during or after a charging operation.

11. A storage battery charging apparatus comprising a relay having three coils one of which is responsive to the charging current the second of which is responsive to the charging voltage and the third of which is responsive to the voltage of the battery to be charged, circuit closing means arranged to be actuated by said relay, circuit controlling means having a plurality of positions in one of which said second and third coils are connected to their respective sources of current whereby said circuit closing means is actuated if both coils act in conjunction but is held open if the two coils act in opposition and in another of which the normal charging connections are established, the connections between said circuit controlling means and the second and third coils being so arranged that the circuit controlling means must be restored to its first mentioned position before the charging operation can be renewed when the battery to be charged has been disconnected from the source during or after a charging operation.

In witness whereof, I have hereunto set my hand this 5th day of June, 1916.

CHESTER I. HALL.